US009965847B2

(12) United States Patent
Gao et al.

(10) Patent No.: US 9,965,847 B2
(45) Date of Patent: May 8, 2018

(54) MULTI-TYPE BGA CHIP VISUAL RECOGNITION METHOD USING LINE BASED CLUSTERING

(71) Applicant: Harbin Institute of Technology, Harbin, Heilongjiang Province (CN)

(72) Inventors: Huijun Gao, Harbin (CN); Wanxin Jin, Harbin (CN); Xianqiang Yang, Harbin (CN); Jinyong Yu, Harbin (CN); Guanghui Sun, Harbin (CN); Weiyang Lin, Harbin (CN); Zhan Li, Harbin (CN)

( * ) Notice: Subject to any disclaimer, the term of this patent is extended or adjusted under 35 U.S.C. 154(b) by 0 days. days.

(21) Appl. No.: 15/323,100

(22) PCT Filed: Jan. 16, 2016

(86) PCT No.: PCT/CN2016/071119
§ 371 (c)(1),
(2) Date: Dec. 30, 2016

(87) PCT Pub. No.: WO2017/020559
PCT Pub. Date: Feb. 9, 2017

(65) Prior Publication Data
US 2017/0193649 A1 Jul. 6, 2017

(30) Foreign Application Priority Data
Aug. 5, 2015 (CN) .......................... 2015 1 0474956

(51) Int. Cl.
G06T 7/00 (2017.01)
G06T 7/90 (2017.01)

(52) U.S. Cl.
CPC .............. G06T 7/0004 (2013.01); G06T 7/90 (2017.01); G06T 2207/30148 (2013.01)

(58) Field of Classification Search
USPC ................................................. 382/141–152
See application file for complete search history.

(56) References Cited

U.S. PATENT DOCUMENTS 6,177,682 B1 * 1/2001 Bartulovic ........... G01N 21/951
250/559.12
2003/0039388 A1 * 2/2003 Ulrich ................ G01B 11/2513
382/145

(Continued)

Primary Examiner — Alex Liew
(74) Attorney, Agent, or Firm — Novoclaims Patent Services LLC; Mei Lin Wong (57) ABSTRACT

A multi-type BGA chip visual recognition method using line based clustering to solve the problems of BGA inspection algorithms which have limited applicability, low flexibility caused by template matching, poor robustness to illumination and interferences and high time complexity. The method is based on: dynamic threshold segmentation of original image, morphological and connected component labelling; BGA extraction based on grayscale connected component and building information list for all complete grayscale BGA solder balls; Building of BGA solder ball label image; local analysis to determine the coarse orientation angle of equivalent BGA array; determining equivalent BGA solder ball clusters for each row and each column and the equivalent BGA solder ball cluster for the boundary by line based clustering; obtaining an accurate orientation angle and center position of BGA chip in the original image by line fitting of boundary BGA solder ball clusters; and extracting different standard parameters of BGA chips.

8 Claims, 8 Drawing Sheets

(56) References Cited

U.S. PATENT DOCUMENTS

2011/0255768 A1* 10/2011 McElfresh .............. G06T 7/001
                                                                    382/141
2015/0269723 A1*  9/2015 Karam ................... G06T 7/0004
                                                                     348/46

* cited by examiner

FIG. 12

MULTI-TYPE BGA CHIP VISUAL RECOGNITION METHOD USING LINE BASED CLUSTERING

CROSS REFERENCE OF RELATED APPLICATION

This is a national phase national application of an international patent application number PCT/CN2016/071119 with a filing date of Jan. 16, 2016, which claimed priority of Chinese application number CN201510474956.X, filing date Aug. 5, 2015. The contents of these specifications, including any intervening amendments thereto, are incorporated herein by reference.

BACKGROUND OF THE PRESENT INVENTION

Field of Invention

The present invention relates to a multi-type BGA chip visual recognition method, and more particularly to a multi-type BGA chip visual recognition method using line-based-clustering approach.

Description of Related Arts

BGA (Ball Gray Array) packaging is currently widely used in integrated circuits due to its characteristics of high integration, large quantity of I/O solder balls, and excellent electronic properties. However, the denser I/O packaging and miniaturization are more likely to lead to chip defects such as ball missing, oversize or undersize balls, extra balls, misshapen balls, ball bridging, and ball offset during the manufacture process of BGA chips. In assembly processes of printed circuit boards using surface mount technology (SMT), the high density of I/O solder balls in BGA chips as well as the multiple alignment types of ball arrays have induced more stringent challenges in relation to accuracy and speed in identification and inspection.

At present, automated optical inspection (AOI) system is commonly applied to identify, inspect and locate the chips in SMT product processes, in which identification is the most basic. During the identification process, a standard parameter database is built for the particular type of chip in the AOI system by the defect-free chips, and this database will provide standard references for the inspection and positioning processes. Specifically for BGA cases, procedures in the AOI system include two stages, which are training (offline identification) and inspection (online inspection).

Training: Building a standard parameter database through identifying defect-free BGA chip samples. Standard database of BGA chip includes ball distribution matrix (distribution pattern of solder balls), ball standard area, ball standard roundness, ball standard row spacing, and ball standard column spacing. However, in the existing AOI systems, the standard parameters database is provided through manual measurements and manual entries. Thus the work load is great, the cost of manpower is high and the degree of automation is low.

Inspection: Extracting features form the BGA chip image and utilizing the standard database as references to diagnose the potential defects and locate the BGA position with respect to image coordinate frame. Common defects of BGA chip include the followings: ball missing, oversize or undersize ball, ball diameter or roundness failure, ball bridging and etc. The characteristics of BGA chips, which are large number of ball pins, small spacing and diverse form of ball alignments, have led to higher requirements in reliability and speed for the inspection algorithm.

The basic workflow in the inspection phase of BGA chip contains image acquisition, solder ball extraction, ball array positioning and ball feature detection. Wherein solder ball extraction is aimed at extracting BGA solder balls from the original acquired image through image segmentation algorithms. Conventional ball extraction methods usually employ a global threshold for image binarization: for example, in the literature "Analysis Ball Grid Array defects by using new image technique", the mean and variance of all pixel gray values are utilized to calculate this global thresholding value; in the literature "A system for automated BGA Inspection", Otsu's algorithm which is capable of adapting to different image brightness is used to compute the global threshold; in the literature "Automated detection and classification of non-wet solder joints", a method of iterative computation based on the statistics of image pixel gray values is used to obtain this threshold.

Traditional methods based on the global threshold value will result in 'over-segmentation' or 'under-segmentation' balls, especially when BGA image are captured from the AOI system which has uneven brightness distribution, thus causing errors in detection results. At the same time, the noise introduced by the image segmentation may be mis-identified as a ball and hinder the subsequent process of ball grid array positioning.

Ball grid array positioning is aimed at determining the position and orientation angle of the BGA with respect to image coordinate system. The mature existing methods (such as HALCON machine vision software) usually employ template matching strategy. Specifically for implementations, a standard ball grid array template is constructed based on BGA information from the standard database, then iterative ball traversals using the relative location relationship of adjacent balls are performed to determine the spatial transformation between BGA template and BGA chip for testing. Since a great volume of traversals and iterations are involved in this type of methods, the calculation complexity and execution time will surge as the number of BGA solder ball rises. Therefore these methods are very difficult to apply to the practical AOI system with high real-time requirements. Also, since the inspection requires the building of a standard BGA template, the algorithm flexibility is decreased. In order to reduce the time complexity in BGA positioning process, literature 'locating and checking of BGA pins position using gray level' adopted a rectangular least squares method to trace the outer border balls for obtaining rotation angle of BGA. However, this method is developed based on the assumption that border balls are strictly aligned as a stand rectangular. Otherwise, the minimum rectangle enclosing the outliers would result in failure. In the literature 'A system for automated BGA Inspection', for the purpose of avoiding processing template matching for all balls, a solder ball located at a particular position of ball array (such as the corner of ball array) is selected to align the inspected BGA to the template. However, this method also fails to address the inconvenience of building a standard template and to provide robustness to the non-ball interferences which are introduced by segmentation stage.

Accordingly, the problems of existing AOI system in relation to identification and inspection process of BGA chip are summarized as follows:

1) In the offline identification process, manual measurements of BGA sample parameters and manual entry of standard parameter data are required for establishing the standard database. The workload is great and the cost of manpower is high.

2) Traditional methods utilize one global threshold value to perform ball segmentation. Consequently, the robustness to image with uneven light distributions is poor and under-segmentation or over-segmentation is easily introduced, thus causing inspection errors.

3) The BGA positioning algorithm based on rectangular least squires or a particular reference ball can only apply to a limited number of BGAs with specified ball arrangements. The applicability to BGAs with sparsely arranged balls or with irregular ball distributions is poor.

4) The BGA positioning algorithm based on traditional template matching method requires the building of standard array template for each type of BGA chips, furthermore, the time complexity for matching is high and the robustness to interferences introduced by ball segmentation process is decreased.

SUMMARY OF THE PRESENT INVENTION

The present invention provides a multi-type BGA chip visual recognition method using line based clustering to address the listed limitations of traditional BGA identification and inspection methods: 1) narrow identification scope: only a particular or a limited number of BGA array types can be identified; for BGA chips with irregularly arranged ball alignments, the applicability is poor or even unable to recognize; 2) low robustness against inhomogeneous image brightness and interferences: ball segmentation using a global threshold causes possibilities of over-segmentation or under-segmentation balls, thus affecting the accuracy of both inspection and positioning process. 3) low flexibility by using the template: the building of standard array template is required for each type of BGA chip; 4) high computation complexity of traditional algorithms while manual measurements and manual entry of BGA standard parameters are required in most cases; Accordingly, a multi-type BGA chip visual recognition method using line based clustering is provided.

According to the present invention, the foregoing and other objects and advantages are attained by the following technical solutions:

Step 1: defining a grayscale BGA chip image acquired from a camera as an original image, performing dynamic thresholding to obtain binary image of solder balls, performing morphological opening and closing operations to the binary image of solder balls, defining each connected component on the processed binary image of solder balls as a binary BGA solder ball, then performing connected component labeling for each binary BGA solder ball;

Step 2: for each binary BGA solder ball after connected component labeling obtained from the step 1, performing grayscale connected component extraction on the corresponding area in the original image to obtain the complete grayscale BGA solder ball, and creating an information list for all the complete grayscale BGA solder balls obtained;

Wherein a content of the information list for all the complete grayscale BGA solder balls comprises: grayscale pixels of each of the complete grayscale BGA solder balls, the center position coordinates of each of the complete grayscale BGA solder balls, a diameter of the minimum outer surrounding circle of each of the complete grayscale BGA solder balls, a perimeter of each of the complete grayscale BGA solder balls and a roundness of each of the complete grayscale BGA solder balls. The grayscale pixel of complete grayscale BGA solder ball includes pixel coordinates and grayscale values;

Step 3: utilizing the information list for all the complete grayscale BGA solder balls obtained from the step 2, building a background image of which grayscale value of each pixel is 0 and the image size is the same as the original image; in the background image, assigning the label of each binary BGA solder ball to the grayscale value of the pixel located at the center position of corresponding complete grayscale BGA solder ball; at this point, defining the background image as BGA solder ball label image, defining the pixels with non-zero grayscale value in the BGA solder ball label image as equivalent BGA solder balls, and defining the array formed by all equivalent BGA solder balls as equivalent BGA array;

Wherein if the original image has M*N number of complete grayscale BGA solder balls, then the BGA solder ball label image has M*N number of equivalent BGA solder balls, an equivalent BGA solder ball is in fact a pixel, the complete grayscale BGA solder balls and the equivalent BGA solder balls are corresponding to each other respectively; in the BGA solder ball label image, calculate the spacing $\Delta\gamma$ of two adjacently positioned equivalent BGA solder balls and define this spacing as a representative spacing value of the equivalent BGA solder balls;

Step 4: utilizing the representative spacing value $\Delta\gamma$ of the equivalent BGA solder balls obtained from the step 3, performing local analysis of equivalent BGA array on the BGA solder ball label image and determining the coarse orientation angle $\Delta\theta$ of the equivalent BGA array;

Wherein the local analysis is divided into a process of local analysis of regular type BGA chip and a process of local analysis of irregular type BGA chip in terms of BGA type, a regular type BGA chip refers to a parallel alignment of BGA solder ball in any two adjacent rows, an irregular type BGA chip refers to a staggered alignment of BGA solder ball in any two adjacent rows;

Step 5: utilizing the representative spacing value $\Delta\gamma$ of the equivalent BGA solder balls obtained from the step 3 and the coarse orientation angle $\Delta\theta$ of the equivalent BGA array obtained from step 4, performing line based clustering for all the equivalent BGA solder balls in the BGA solder ball label image to obtain row equivalent BGA solder ball clusters, column equivalent BGA solder ball clusters, and boundary equivalent BGA solder ball clusters;

Step 6: utilizing the grayscale value of each equivalent BGA solder ball in the boundary equivalent BGA solder ball clusters in the BGA solder ball label image, searching in the information list for all complete grayscale BGA solder balls for the center position coordinates of the respective corresponding complete grayscale BGA solder balls based on the center position coordinates found, performing line fitting for the boundary to obtain the orientation angle and center position of the BGA chip in the original image;

Step 7: utilizing the row equivalent BGA solder ball clusters and the column equivalent BGA solder ball clusters obtained from the step 5, and utilizing the information list for all complete grayscale BGA solder balls obtained from the step 2, performing line fitting for each row equivalent BGA solder ball cluster and each column equivalent BGA solder ball cluster; defining the mean of spacing of adjacent row fitting lines as the standard row spacing of BGA solder balls; defining the mean of spacing of adjacent column fitting lines as the standard column spacing of BGA solder balls.

Step 8: utilizing the fitting lines for each row equivalent BGA solder ball cluster and each column equivalent BGA solder ball cluster, performing row by row and column by column searching for equivalent BGA solder balls on the BGA solder ball label image to obtain BGA solder ball distribution matrix; based on the equivalent BGA solder balls obtained by row by row and column by column searching and the information list for all complete grayscale BGA solder balls obtained from the step 2, obtaining the standard diameter of BGA solder ball, the standard perimeter of BGA solder ball and the standard roundness of BGA solder ball.

Advantageous Effect of the Present Invention

Figure 6:
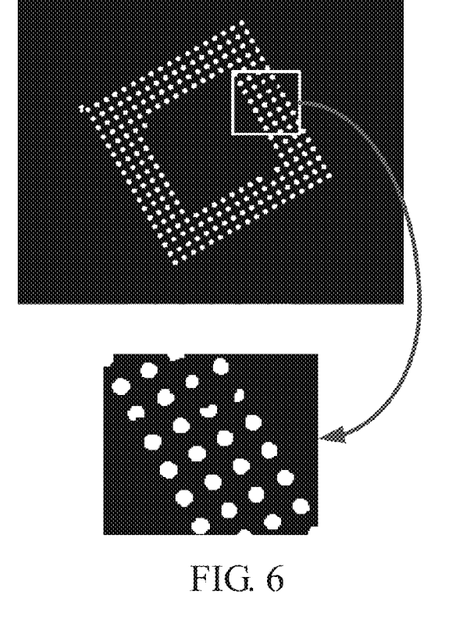
FIG. 6 is a typical illustration of the result of extraction of BGA solder ball by traditional process based on one global threshold value.
Figure 7:
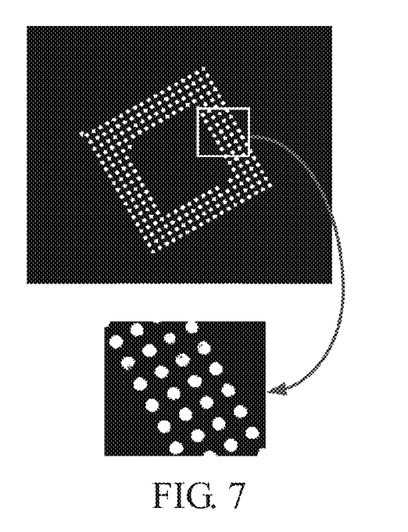
FIG. 7 is a typical illustration of the results of extraction of BGA solder ball by using the method of the present invention.
Figure 8:
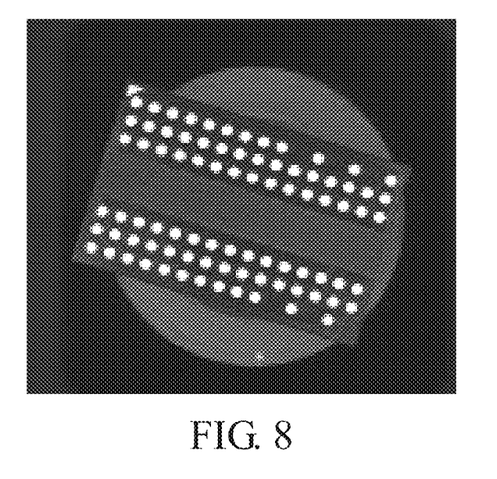
FIG. 8 is a representative illustration which shows that the method of the present invention can identify the non-solder ball interference in the upper left corner.
Figure 9:
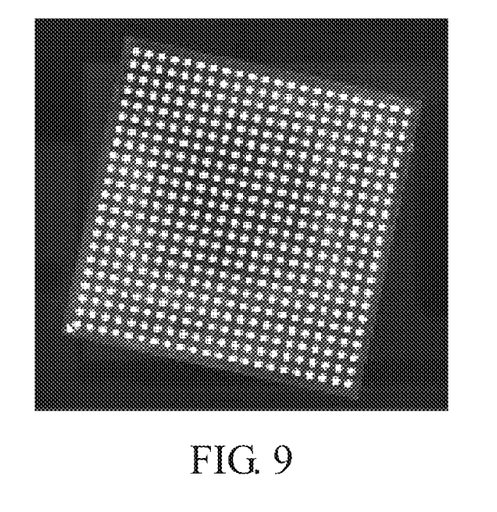
FIG. 9 is a representative illustration which shows that the method of the present invention can identify the non-solder ball interference in the down left corner.
Figure 10:
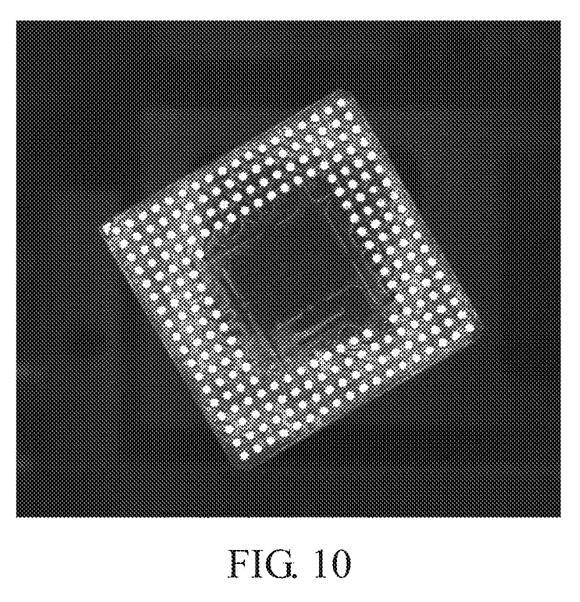
FIG. 10 is an image of the BGA chip to be tested in the present invention.
Figure 11:
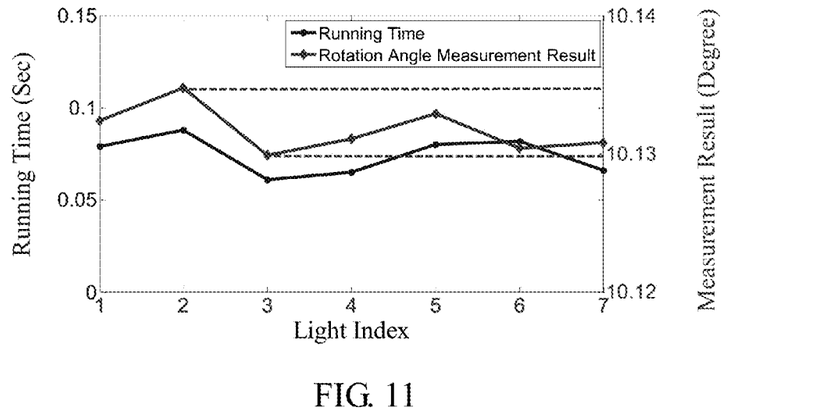
FIG. 11 is a graph showing the effect of different light intensities on algorithm running time and orientation computation accuracy for the tested BGA chip in FIG. 10.
Figure 12:
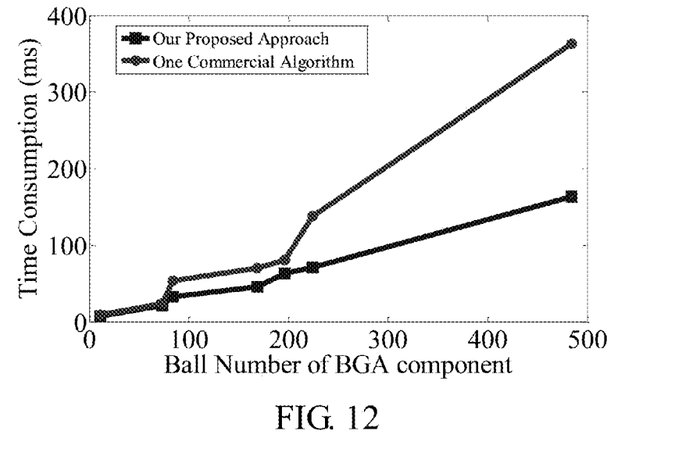
FIG. 12 is a comparison chart of running time according to different number of BGA solder balls between a conventional business algorithm and the recognition method of the present invention.

1) According to the BGA chip visual recognition method of the present invention, the processing of multi-type BGA chip visual recognition method does not require building matching templates and has strong flexibility. For the training (identification) phase in practical application of AOI system, the method of the present invention can be utilized to process parameter identifications for defect-free GBA chip samples to establish the standard database; for the inspection phase, the method of the present invention can be utilized to inspect BGA by feature extractions while at the same time the rotation angle and center position of the BGA chip can be determined. 2) The method of the present invention includes solder ball extraction process based on grayscale connected components. Compared with traditional global threshold value based segmentation, the maximum level of integrity of BGA balls under non-uniform illumination condition can be ensured and thus the accuracy of the recognition results can be guaranteed. The comparative results of the two solder ball extraction method are illustrated in FIG. 6 and FIG. 7; 3) The line-based-clustering visual recognition method can recognize the vast majority of BGA chips: regular type BGA chips, irregular type BGA chips, BGA chip type with sparse solder ball arrangement or BGA chip with other types of solder ball arrangement. 4) Owing to the characteristics of the line-based-clustering method of the present invention, the present recognition method is capable of automatically identifying and filtering the non-ball interferences (easily mistaken as solder ball) introduced by ball segmentation process. The robustness of the algorithm to background interferences is increased and the accuracy and precision of BGA ball array positioning are ensured. FIG. 8 and FIG. 9 are representative figures that the algorithm of the present invention can identify the non-solder ball interference. 5) The recognition algorithm of the present invention is robust to the non-uniform illumination of the acquired image. Under the experimental condition: the chip for testing is shown in FIG. 10, the resolution of the acquired image is 840*1160, the graph of effect of different light intensity on algorithm running time and detection accuracy is shown in FIG. 11; 6) The line-based-clustering visual recognition method of the present invention has low computation complexity. Under a typical experimental condition: the illumination condition is ideal; the resolution of the acquired image is 840*1160. For BGA chips with different ball numbers, the running time of a conventional business algorithm and the recognition algorithm of the present invention are compared and shown in FIG. 12: (PC platform: Intel® Pentium® B960. 2.2 GHz dual-core, C++). 7) The line-based-clustering visual recognition of the present invention can also be applied to recognition of graphics with grid array patterns.

DETAILED DESCRIPTION OF THE PREFERRED EMBODIMENT

Embodiment 1

According to this preferred embodiment 1, a multi-type BGA chip visual recognition using line based clustering comprises the following steps:

Step 1: defining a grayscale BGA chip image acquired from a camera as an original image, performing dynamic thresholding to obtain binary image of solder balls, performing morphological opening and closing operations to the binary image of solder balls, defining each connected component on the processed binary image of solder balls as a binary BGA solder ball, then performing connected component labeling for each binary BGA solder ball;

Wherein a mathematical express of processing the original image through dynamic thresholding to obtain the binary image of solder balls I(x,y) is as follows:

$$I(x, y) = \begin{cases} 1 & f(x, y) \geq g(x, y) + C \\ 0 & f(x, y) < g(x, y) + C \end{cases}$$

In the above formula, f(x,y) refers to the original image, g(x,y) refers to the image after applying mean filtering to f(x,y). C refers to the preset constant.

Step 2: for each binary BGA solder ball after connected component labeling obtained from the step 1, performing grayscale connected component extraction on the corresponding area in the original image to obtain the complete grayscale BGA solder ball, and creating an information list for all the complete grayscale BGA solder balls obtained;

Wherein the content of the information list for all the complete grayscale BGA solder balls comprises: grayscale pixels of each of the complete grayscale BGA solder balls, the center position coordinates of each of the complete grayscale BGA solder balls, the diameter of the minimum outer surrounding circle of each of the complete grayscale BGA solder balls, the perimeter of each of the complete grayscale BGA solder balls and the roundness of each of the complete grayscale BGA solder ball. Each grayscale pixel of each complete grayscale BGA solder ball includes pixel coordinates and grayscale value;

Step 3: utilizing the information list for all the complete grayscale BGA solder balls obtained from the step 2, building a background image of which grayscale value of each pixel is 0 and the image size is the same as the original image; in the background image, assigning the label of each binary BGA solder ball to the grayscale value of the pixel located at the center position of corresponding complete grayscale BGA solder ball; at this point, defining the background image as BGA solder ball label image, defining the pixels with non-zero grayscale value in the BGA solder ball label image as equivalent BGA solder balls, and defining the array formed by all equivalent BGA solder balls as equivalent BGA array;

Wherein if the original image has M*N number of complete grayscale BGA solder balls, then the BGA solder ball label image has M*N number of equivalent BGA solder balls, an equivalent BGA solder ball is in fact a pixel, the complete grayscale BGA solder balls and the equivalent BGA solder balls are corresponding to each other respectively; in the BGA solder ball label image, calculate the spacing $\Delta\gamma$ of two adjacently positioned equivalent BGA solder balls and define this spacing as a representative spacing value of the equivalent BGA solder balls;

Step 4: utilizing the representative spacing value $\Delta\gamma$ of the equivalent BGA solder balls obtained from the step 3, performing local analysis of equivalent BGA array on the BGA solder ball label image and determining the coarse orientation angle $\Delta\theta$ of the equivalent BGA array;

Wherein the local analysis is divided into a process of local analysis of regular type BGA chip and a process of local analysis of irregular type BGA chip in terms of BGA type, a regular type BGA chip refers to a parallel alignment of BGA solder ball in any two adjacent rows, an irregular type BGA chip refers to a staggered alignment of BGA solder ball in any two adjacent rows;

Step 5: utilizing the representative spacing value $\Delta\gamma$ of the equivalent BGA solder balls obtained from the step 3 and the coarse orientation angle $\Delta\theta$ of the equivalent BGA array obtained from step 4, perform line based clustering for all the equivalent BGA solder balls in the BGA solder ball label image to obtain row equivalent BGA solder ball clusters, column equivalent BGA solder ball clusters, and boundary equivalent BGA solder ball clusters;

Step 6: utilizing the grayscale value of each equivalent BGA solder ball in the boundary equivalent BGA solder ball clusters in the BGA solder ball label image, to search in the information list for all complete grayscale BGA solder balls for the center position coordinates of the respective corresponding complete grayscale BGA solder balls based on the center position coordinates found, performing line fitting for the boundary to obtain the orientation angle and center position of the BGA chip in the original image;

Step 7: utilizing the row equivalent BGA solder ball clusters and the column equivalent BGA solder ball clusters obtained from the step 5, and utilizing the information list for all complete grayscale BGA solder balls obtained from the step 2, performing line fitting for each row equivalent BGA solder ball cluster and each column equivalent BGA solder ball cluster; defining the mean of spacing of adjacent row fitting lines as the standard row spacing of BGA solder balls; defining the mean of spacing of adjacent column fitting lines as the standard column spacing of BGA solder balls.

Step 8: utilizing the fitting lines for each row equivalent BGA solder ball cluster and each column equivalent BGA solder ball cluster, performing row by row and column by column searching for equivalent BGA solder balls on the BGA solder ball label image to obtain BGA solder ball distribution matrix; based on the equivalent BGA solder balls obtained by row by row and column by column searching and the information list for all complete grayscale BGA solder balls obtained from the step 2, obtaining the standard diameter of BGA solder ball, the standard perimeter of BGA solder ball and the standard roundness of BGA solder ball.

Embodiment 2

The difference between this embodiment and embodiment 1 is that: in the step 2, the information list for all complete grayscale BGA solder balls includes specific data which comprises:

(1) grayscale pixels of each complete grayscale BGA solder ball: the process of grayscale connected component extraction on a corresponding area in the original image is based on the following formula:

$$(x_p, y_p) \begin{cases} \in R & |f(x_p, y_p) - \mathrm{mean}[R]| < \varsigma \ \&\& \ \exists (x_{adj}, y_{adj}) \in R, \\ & |f(x_p, y_p) - f(x_{adj}, y_{adj})| < \Delta \\ \notin R & \text{else} \end{cases}$$

In the above formula, $(x_p, y_p)$ refers respectively to the horizontal and vertical coordinates defined on the original image, R refers to the pixel set of current grayscale BGA solder ball, mean[R] refers to the mean grayscale value of all pixels in the current grayscale BGA solder ball, $(x_{adj}, y_{adj})$ refers to the coordinates which is adjacent in 8-conectivity to $(x_p, y_p)$ which is already belonged to the pixels of R, $\varsigma$ and $\Delta$ refers to the preset constant; $f(x_p, y_p)$ refers to the grayscale value at the point $(x_p, y_p)$ in the original image;

the process of grayscale connected component extraction can extract to the greatest extent all the grayscale pixels included in each BGA solder ball, and the grayscale BGA solder ball extracted is define as complete grayscale BGA solder ball;

(2) the formula to calculate the center position coordinates $(x_{center}^i, y_{center}^i)$ of the i-th complete grayscale BGA solder ball is as follows:

$$(x_{center}^j, y_{center}^j) = \left( \frac{\sum_{k=1}^{N_i} x_k}{N_i}, \frac{\sum_{k=1}^{N_i} y_k}{N_i} \right)$$

In the above formula, $(x_k, y_k)$ refers to the k-th number of grayscale pixel coordinates contained in the i-th complete grayscale BGA solder ball, $N_i$ refers to the number of grayscale pixels contained in the i-th complete grayscale BGA solder ball, i is a positive integer, k is a positive integer;

(3) The area $S_i$ of the i-th complete grayscale BGA solder ball is the number of pixels $N_i$ contained in this complete grayscale BGA solder ball; the formula to calculate the roundness $C_i$ for the i-th complete grayscale BGA solder ball is as follows:

$$C_i = \frac{4\pi N_i}{L_i^2}$$

In the above formula, $L_i$ is the perimeter of the i-th complete grayscale BGA solder ball, which is the peripheral pixel number of this complete grayscale BGA solder ball. The other parameters are the same as in the embodiment 1.

Figure 1:
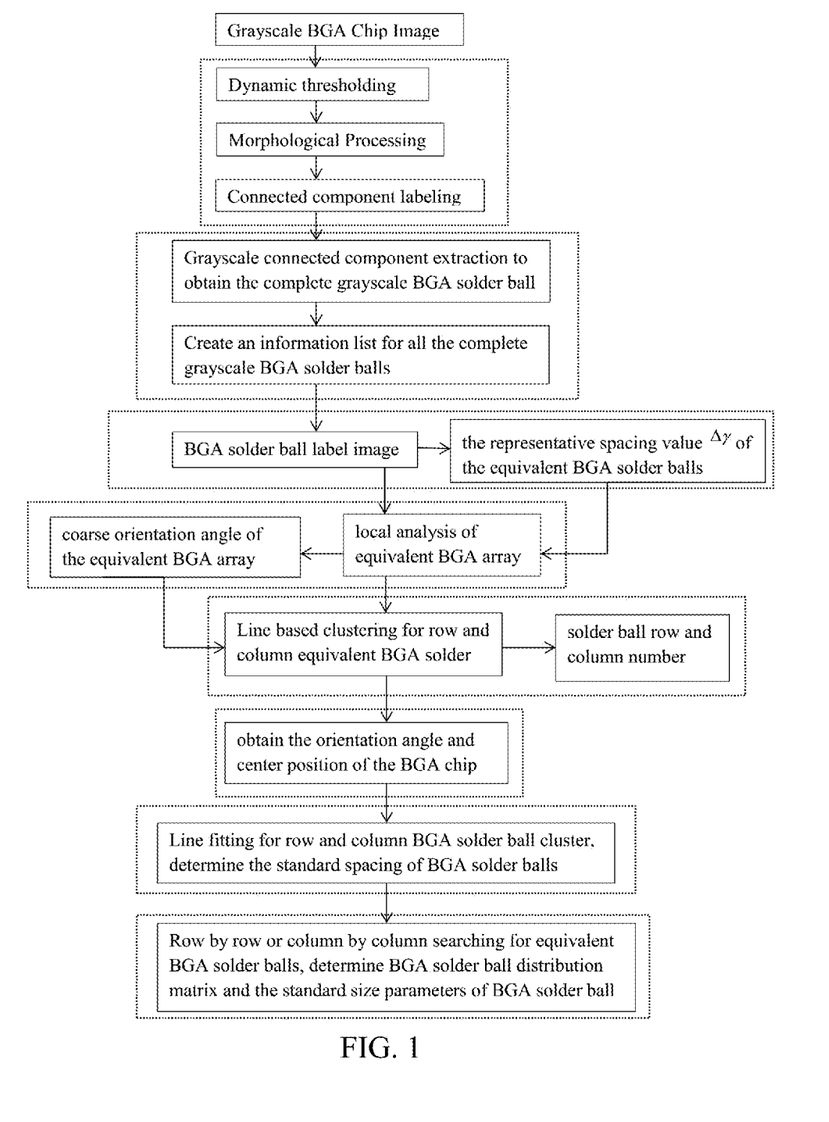
FIG. 1 is a flow chart of multi-type BGA chip visual recognition method using line based clustering according to a preferred embodiment 1 of the present invention.
Figure 2:
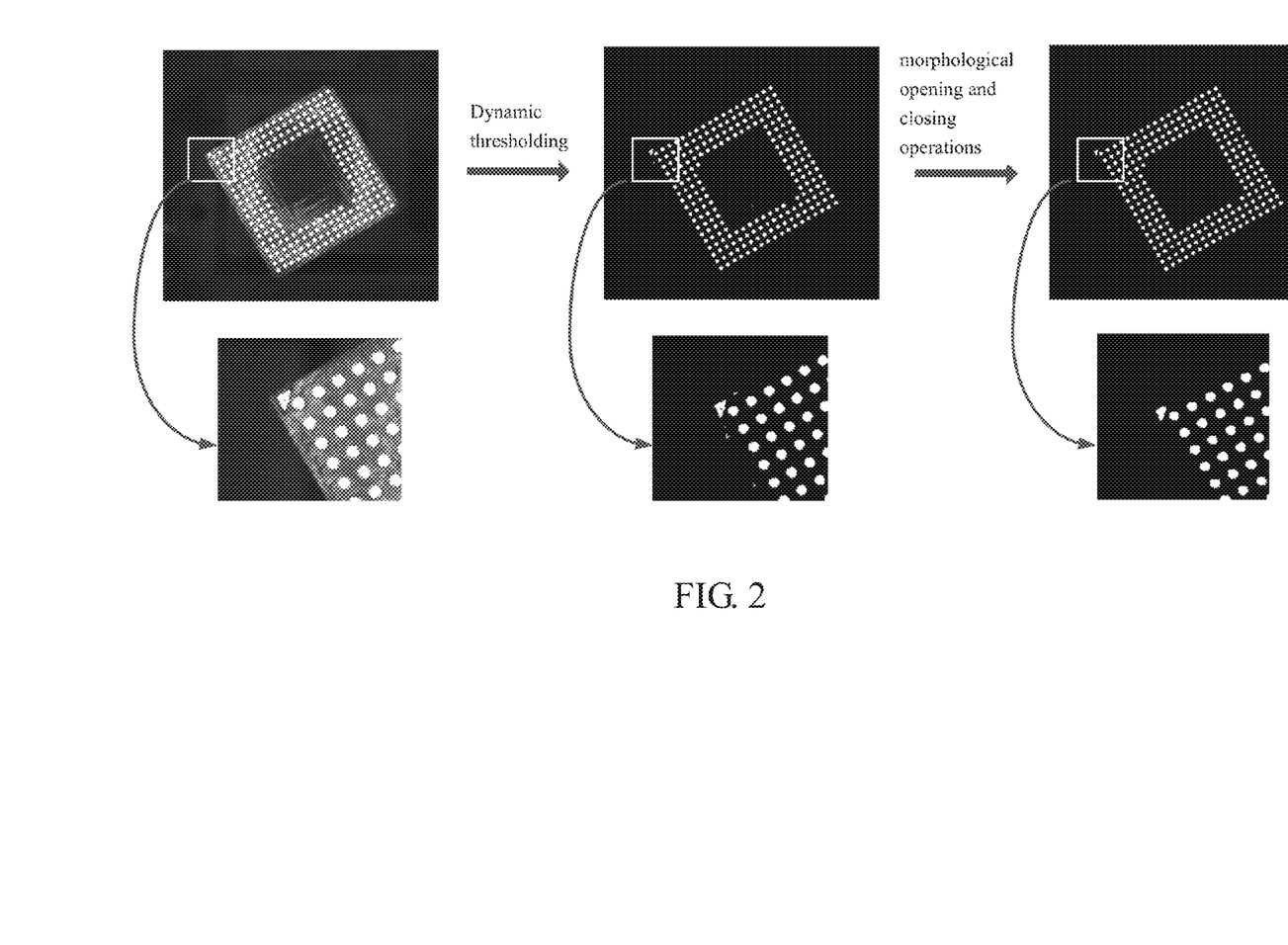
FIG. 2 is a typical illustration of results after performing dynamic thresholding and further morphological opening and closing operation to an original image according to the above preferred embodiment 1 of the present invention.
Figure 3A:
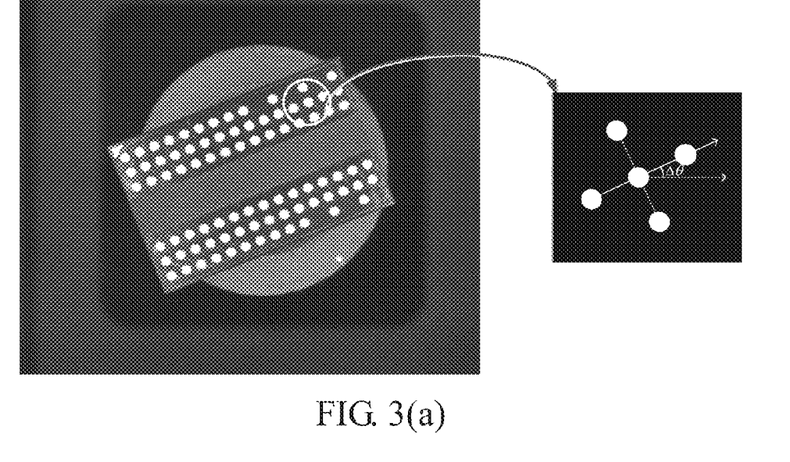
FIG. 3(a) is a typical illustration of a local analysis of regular type BGA chip according to a preferred embodiment 3 of the present invention.

Embodiment 3 the difference between this embodiment and embodiment 1 or 2 is that: in the step 4, the specific process for local analysis of regular type BGA chips is typically illustrated in FIG. 3(a):

Step 4-1: in the BGA solder ball label image, select any equivalent BGA solder ball;

Step 4-2: define the equivalent BGA solder ball selected in the step 4-1 as a center, within the radius range of $3\Delta\gamma$, search within the scope of four directions of)) [−45°, 45°), [45°, 135°), [135°, 225°) and [−135°, −45°) respectively to locate the closest equivalent BGA solder ball to the equivalent BGA solder ball selected in the step 4-1, if the closest equivalent BGA solder ball in the four directions does not exist, repeat the step 4-1;

Step 4-3: for the closest adjacent equivalent BGA solder ball at each direction, the coarse orientation angle $\Delta\theta$ of equivalent BGA array corresponding to the j direction is obtained by the following formula:

$$\Delta\theta_j = \pm\arctan\left( \frac{y_{adj}^j - y_{center}}{x_{adj}^j - x_{center}} \right) \pm 90°$$

In the above formula, $(x_{center}, y_{center})$ refers to the coordinates of the center of the equivalent BGA solder ball, $(x_{adj}^j, y_{adj}^j)$ refers to the closest equivalent BGA solder ball corresponding to the j direction; meanwhile, ±90° and positive and negative sign is selected or removed based on the conditions of the four directions; j=1 refers to the range of [−45°, 45°); j=2 refers to the range of [45°, 135°); j=3 refers to the range of) [135°, 225°); j=4 refers to the range of [−135°, −45°); and taking an average of all $\Delta\theta_j$ to determine the final coarse orientation angle $\Delta\theta$ of the equivalent BGA array. In the image coordinates, $\Delta\theta$ in clockwise direction is positive. The other steps and parameters are the same as one of the embodiment 1 and the embodiment 2.

Embodiment 4

Figure 3B:
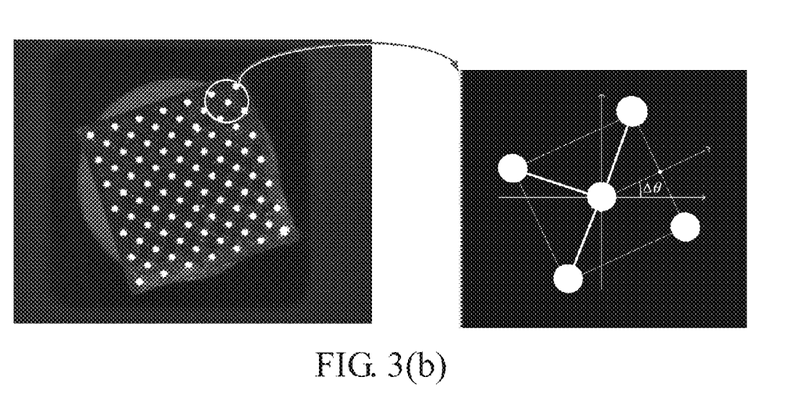
FIG. 3(b) is a typical illustration of a local analysis of irregular type BGA chip according to a preferred embodiment 4 of the present invention.

The difference between this embodiment and one of the other embodiments 1-3 is that: in the step 4, the specific process of local analysis of irregular type BGA chips is typically illustrated in FIG. 3(b):

Step 4-1: in the BGA solder ball label image, select any equivalent BGA solder ball;

Step 4-2: define the equivalent BGA solder ball selected in the step 4-1 as the center, within the radius range of $3\Delta\gamma$, search within the scope of four directions of) [0°, 90°), [90°, 180°), [180°, 270°) and [−90°, 0°) respectively to locate the closest equivalent BGA solder ball to the equivalent BGA solder ball at the center, if the closest equivalent BGA solder ball in the four directions does not exist, repeat the step 4-1;

Step 4-3: for each closest adjacent equivalent BGA solder ball at each direction, the coarse orientation angle $\Delta\theta$ of equivalent BGA array corresponding to the j direction is obtained by the following formula:

$$\Delta\theta_j = \pm\arctan\left( \frac{y_{adj}^j - y_{center}}{x_{adj}^j - x_{center}} \right) \pm 90°$$

In the above formula, $(x_{center}, y_{center})$ refers to the coordinates of the center of the equivalent BGA solder ball, $(x_{adj}^j, y_{adj}^j)$ refers to the closest equivalent BGA solder ball corresponding to the j direction; meanwhile, the ±90° in the above formula and positive and negative sign is selected or removed based on the conditions of the four directions; j=1 refers to the range of [0°, 90°); j=2 refers to the range of [90°, 180°); j=3 refers to the range of [180°, 270°); j=4 refers to the range of [−90°, 0°); and taking an average of all $\Delta\theta_j$ to determine the final coarse course orientation angle $\Delta\theta$ of the equivalent BGA array. In the image coordinates, $\Delta\theta$ in clockwise direction is positive. The other steps and parameters are the same as one of the embodiments 1-3.

Embodiment 5

Figure 4:
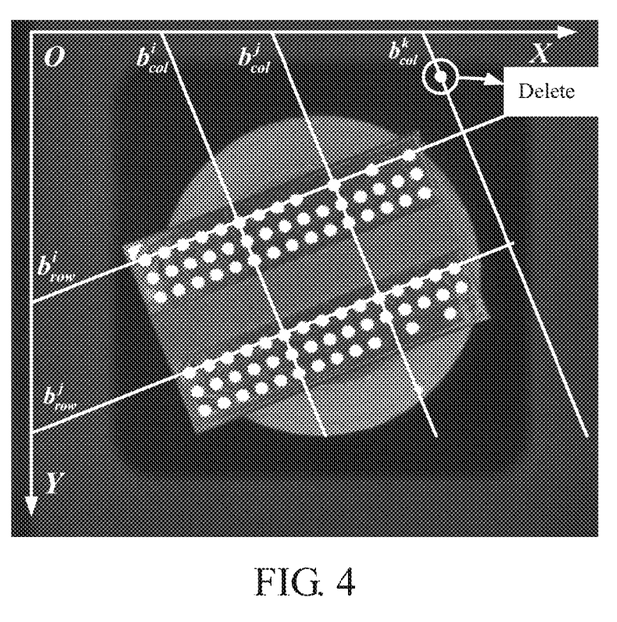
FIG. 4 is a typical illustration of perform line based clustering to BGA solder b' balls according to a preferred embodiment 5 of the present invention, wherein row refers to the intercept of the row line equation passing through the center position coordinates of j-th BGA solder ball, $b_{col}^{j}$ refers to the intercept of the column equation passing through the center position coordinates of j-th BGA solder ball, $b_{row}^{i}$ refers to the intercept of the row line equation passing through the center position coordinates of i-th BGA solder ball, $b_{col}^{i}$ refers to the intercept of the column line equation passing through the center position coordinates of i-th BGA solder ball, $b_{col}^{k}$ refers to the intercept of the column line equation passing through the non-ball interference.
Figure 5:
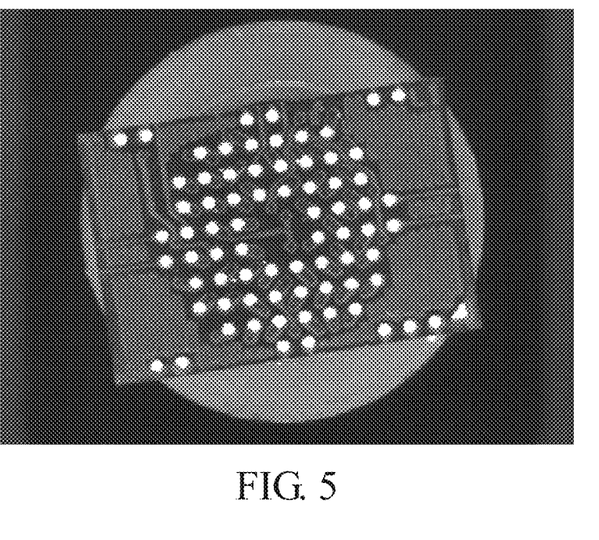
FIG. 5 is a typical illustration of a BGA chip with sparse solder ball alignment.

The difference between this embodiment and one of the other embodiments 1-4 is that: in the step 5, a specific process of utilizing the representative spacing value $\Delta\gamma$ of the equivalent BGA solder balls obtained from step 3 and the coarse orientation angle $\Delta\theta$ of the equivalent BGA array obtained from step 4, performing line based clustering for all the equivalent BGA solder balls in the BGA solder ball label image to obtain row equivalent BGA solder ball clusters, column equivalent BGA solder ball clusters and boundary equivalent BGA solder ball clusters are as follows:

Step 5-1: based on the coarse orientation angle $\Delta\theta$ of the equivalent BGA array, determining the row line equation expression of equivalent BGA solder balls as: $y_{center}=\tan(\Delta\theta)x_{center}+b_{row}$ and the column line equation expression of equivalent BGA solder balls as: $y_{center}=\tan(\Delta\theta+90°)(x_{center}-b_{col})$;

Wherein, $(x_{center}, y_{center})$ refers to the center position coordinates of the complete grayscale BGA solder ball that the row or column lines pass through, $b_{row}$ refers to the intercept of row line with y axis of the image coordinate system, $b_{col}$ refers to the intercept of column line with the x axis of the image coordinate system;

Step 5-2: determining the classification threshold for the row line and the column line based clustering:

$$\text{intercept\_thresh} = \frac{0.3 \cdot \Delta \gamma}{\sin \Delta \theta};$$

Step 5-3: processing row line based clustering for all equivalent BGA solder balls by utilizing the coordinates $(x_{center}^i, y_{center}^i)$ of the i-th equivalent BGA solder ball to inversely calculate the intercept of row line equation passing through the solder ball, where:

$$b_{row}^i = y_{center}^i - \tan(\Delta\theta) x_{center}^i;$$

Step 5-4: base on the classification threshold intercept_thresh, perform clustering for all obtained row intercepts, that is with the distance between current intercept $b_{row}^i$ and one cluster center within the classification threshold intercept_thresh, the current row intercept $b_{row}^i$ is clustered into this class, the equivalent BGA solder balls corresponding to row intercepts of one class is accordingly clustered together to form a row equivalent BGA solder ball cluster and the equivalent BGA solder balls in one row cluster are located at the same row;

Step 5-5: after the process of clustering in step 5-4, identifying the row equivalent BGA solder ball cluster having only one intra-cluster element as non-ball interference and exclude this cluster; the number of row equivalent BGA solder ball clusters is the row number of solder balls in the BGA chip;

then sorting all the row equivalent BGA solder ball clusters based on the ascending order of the averages of their corresponding intra-class row intercepts, the row equivalent BGA solder ball clusters obtained after sorting process are arranged in ascending order based on the row number of the equivalent BGA array;

Step 5-6: processing column line based clustering for all equivalent BGA solder balls: utilize the coordinates $(x_{center}^i, y_{center}^i)$ of the i-th equivalent BGA solder ball to inversely calculate the column intercept $b_{col}^i$ of line equation passing through the solder ball, where:

$$b_{col}^i = x_{center}^i - \frac{y_{center}^i}{\tan(\Delta\theta + 90°)}$$

Step 5-7: base on the classification threshold: intercept_thresh, performing clustering for all obtained column intercepts, that is with the distance between the current column intercept $b_{col}^i$ and one cluster center within the threshold value intercept_thresh the current column intercept $b_{col}^i$ is clustered into this class, the equivalent BGA solder balls corresponding to the column intercepts of one class is accordingly clustered together to form a column equivalent BGA solder ball column cluster and the equivalent BGA solder balls in one column cluster are located at the same column;

Step 5-8: after the process of clustering in step 5-7, identify the column equivalent BGA solder ball cluster having only one intra-cluster element as non-ball interference and exclude this cluster; the number of column equivalent BGA solder ball clusters is the column number of solder balls;

then sorting all the column equivalent BGA solder ball clusters based on the ascending order of averages of their corresponding intra-class column intercepts, the column equivalent BGA solder ball clusters obtained after sorting process are arranged in ascending order based on the column number of the equivalent BGA array;

Step 5-9: extracting the first group and last group of the sorted row equivalent BGA solder ball clusters; extracting the first group and last group of the sorted column equivalent BGA solder ball clusters; and defining the extracted four groups as the boundary equivalent BGA solder ball clusters.

In the step 5-4 and 5-7, based on the threshold intercept_thresh, the detailed process of clustering for all obtained row intercepts and for all obtained column intercepts are as follows (only the clustering of row intercepts is used for exemplary illustration):

Step 1: Initializing $b_{row}^1$ to the first class $\Omega_1$;

Step 2: if $b_{row}^i$, where i=2, 3 ..., and the cluster center $b_j^{mean}$ of the j-th class $\Omega_j$, where j=1, 2, 3 ... k, fulfill $|b_{row}^i - b_j^{mean}| < \text{intercept\_thresh}$, then $b_{row}^i$ is classified in the j class and updating the cluster center $b_j^{mean}$; otherwise, initializing $b_{row}^i$ to the k+1 class; wherein the cluster center $b_j^{mean}$ for $\Omega_j$ class refers to the average of all intercepts inside the $\Omega_j$ class;

Step 3: i=i+1, processing the step 2. The other steps and parameters are the same as one of the embodiments 1-4.

Embodiment 6

The difference between this embodiment and one of the other embodiments 1-5 is that: in the step 7, the process of utilizing the information list for all complete grayscale BGA solder balls obtained from step 2 to perform line fitting for each row equivalent BGA solder ball cluster comprises the followings:

utilizing the grayscale value of each equivalent BGA solder ball in current row equivalent BGA solder ball cluster in the BGA solder ball label image, searching the center position coordinates of the corresponding complete grayscale BGA solder ball in the information list for all complete grayscale BGA solder balls, and performing line fitting for the center position coordinates of the complete grayscale BGA solder ball in each row. The other steps and parameters are the same as one of the embodiments 1-5.

Embodiment 7

The difference between this embodiment and one of the other embodiments 1-6 is that: in the step 7, the process of utilizing the information list for complete grayscale BGA solder ball obtained from step 2 to perform line fitting for each column equivalent BGA solder ball cluster comprises the followings:

Utilizing the grayscale value of each equivalent BGA solder ball in current column equivalent BGA solder ball cluster in the BGA solder ball label image, searching the center position coordinates of the corresponding complete grayscale BGA solder ball in the information list for all complete grayscale BGA solder balls, and performing line fitting for the center position coordinates of the complete grayscale BGA solder ball in each column. The other steps and parameters are the same as one of the embodiments 1-6.

Embodiment 8

The difference between this embodiment and one of the other embodiments 1-7 is that: in the step 8, the specific process of utilizing the fitting lines for each row equivalent BGA solder ball cluster and each column equivalent BGA solder ball cluster, performing row by row and column by column searching for equivalent BGA solder balls on the BGA solder ball label image to obtain BGA solder ball distribution matrix; based on the equivalent BGA solder balls obtained by row by row and column by column searching and the information list for all complete grayscale BGA solder balls obtained from step 2, obtaining the standard diameter of BGA solder ball, the standard perimeter of BGA solder ball and the standard roundness of BGA solder ball is as follows:

Solving the intersection positions of each row line fitting equation for the row equivalent BGA solder ball cluster and each column line fitting equation for the column equivalent BGA solder ball cluster, using the intersections positions as the centers to perform local searching on the BGA solder ball label image within the radius of $\Delta\gamma/2$; if a particular equivalent BGA solder ball is located, the value at the corresponding row and column position in the BGA arrangement matrix is set to 1, otherwise, the value at the corresponding row and column position in the BGA arrangement array is set to 0.

The specific process which based on the equivalent BGA solder balls obtained by row by row and column by column searching and the information list for all complete grayscale BGA solder balls obtained from step 2, obtaining the standard diameter of BGA solder ball, the standard perimeter of BGA solder ball and the standard roundness of BGA solder ball is as follows:

defining the average value of the diameters of minimum outer surrounding circle in the information list corresponding to all the equivalent BGA solder balls obtained by searching as the standard diameter of the BGA solder ball; defining the average value of the perimeters in the information list corresponding to all the equivalent BGA solder ball obtained by searching as the standard perimeter of the BGA solder ball; defining the average value of the roundness in the information list corresponding to all the equivalent BGA solder ball obtained by searching as the standard roundness of the BGA solder ball. The other steps and parameters are the same as one of the embodiments 1-7.

What is claimed is:

1. A multi-type BGA chip visual recognition method using line based clustering, characterized in that: the multi-type BGA chip visual recognition method using line based clustering comprises the steps of:

Step 1: defining a grayscale BGA chip image acquired from a camera as an original image, performing dynamic thresholding to obtain binary image of solder balls, performing morphological opening and closing operations to the binary image of solder balls, defining each connected component on the processed binary image of solder balls as a binary BGA solder ball, then processing connected component labeling for each binary BGA solder ball;

Step 2: for each binary BGA solder ball after processing connected component labeling obtained from the step 1, performing grayscale connected component extraction on the respective corresponding area in the original image to obtain a complete grayscale BGA solder ball, and creating an information list for all the complete grayscale BGA solder balls obtained;

wherein a content of the information list for all the complete grayscale BGA solder balls comprises: grayscale pixels of each of the complete grayscale BGA solder balls, center position coordinates of each of the complete grayscale BGA solder balls, a diameter of minimum outer surrounding circle of each of the complete grayscale BGA solder balls, a perimeter of each of the complete grayscale BGA solder balls and a roundness of each of the complete grayscale BGA solder balls; the grayscale pixels of each of the complete grayscale BGA solder balls includes pixel coordinates and grayscale values;

Step 3: utilizing the information list for all the complete grayscale BGA solder balls obtained from the step 2, building a background image of which the grayscale value of each pixel is 0 and the image size is the same as the original image; in the background image, assigning the label of each binary BGA solder ball to the grayscale value of the pixel located at the center position of the corresponding complete grayscale BGA solder ball; at this point, defining the background image as BGA solder ball label image, defining the pixels with non-zero grayscale value in the BGA solder ball label image as equivalent BGA solder balls, and defining the array formed by all equivalent BGA solder balls as equivalent BGA array;

wherein if the original image has M*N number of complete grayscale BGA solder balls, then the BGA solder ball label image has M*N number of equivalent BGA solder balls, an equivalent BGA solder ball is in fact a pixel, the complete grayscale BGA solder balls and the equivalent BGA solder balls are corresponding to each other respectively; in the BGA solder ball label image, calculate the spacing $\Delta\gamma$ of two adjacently positioned equivalent BGA solder balls and define this spacing as a representative spacing value of the equivalent BGA solder balls;

Step 4: utilizing the representative spacing value $\Delta\gamma$ of the equivalent BGA solder balls obtained from the step 3, performing local analysis of equivalent BGA array on the BGA solder ball label image and determining the coarse orientation angle $\Delta\theta$ of the equivalent BGA array;

Wherein the local analysis is divided into a process of local analysis of regular type BGA chip and a process of local analysis of irregular type BGA chip in terms of BGA type, a regular type BGA chip refers to a parallel alignment of BGA solder ball in any two adjacent rows, an irregular type BGA chip refers to a staggered alignment of BGA solder ball in any two adjacent rows;

Step 5: utilizing the representative spacing value $\Delta\gamma$ of the equivalent BGA solder balls obtained from the step 3 and the coarse orientation angle $\Delta\theta$ of the equivalent BGA array obtained from step 4, perform line based clustering for all the equivalent BGA solder balls in the BGA solder ball label image to obtain row equivalent BGA solder ball clusters, column equivalent BGA solder ball clusters, and boundary equivalent BGA solder ball clusters;

Step 6: utilizing the grayscale value of each equivalent BGA solder ball in the boundary equivalent BGA solder ball clusters in the BGA solder ball label image, searching in the information list for all the complete grayscale BGA solder balls for the center position coordinates of the respective corresponding complete grayscale BGA solder balls based on the center position coordinates found, performing line fitting for the boundary to obtain the orientation angle and center position of the BGA chip in the original image;

Step 7: utilizing the row equivalent BGA solder ball clusters and the column equivalent BGA solder ball clusters obtained from the step 5 and utilizing the information list for all complete grayscale BGA solder balls obtained from the step 2, performing line fitting for each row equivalent BGA solder ball cluster and each column equivalent BGA solder ball cluster; defining the mean of spacing of adjacent row fitting lines as the standard row spacing of BGA solder balls; defining the mean of spacing of adjacent column fitting lines as the standard column spacing of BGA solder balls; and Step 8: utilizing the fitting lines for each row equivalent BGA solder ball cluster and each column equivalent BGA solder ball cluster, performing row by row and column by column searching for equivalent BGA solder balls on the BGA solder ball label image to obtain BGA solder ball distribution matrix; based on the equivalent BGA solder balls obtained by row by row and column by column searching and the information list for all complete grayscale BGA solder balls obtained from the step 2, obtaining the standard diameter of BGA solder ball, the standard perimeter of BGA solder ball and the standard roundness of BGA solder ball.

2. The multi-type BGA chip visual recognition method using line based clustering according to claim 1, characterized in that: in the step 2, the information list for all complete grayscale BGA solder balls comprises specific data which comprises grayscale pixels of each of the complete grayscale BGA solder ball, center position coordinates of each of the complete grayscale BGA solder ball and roundness of each complete grayscale BGA solder ball, wherein:

in the grayscale pixels of each complete grayscale BGA solder ball: the process of grayscale connected component extraction on a corresponding area in the original image is based on formula (a):

$$(x_p, y_p) \begin{cases} \in R & |f(x_p, y_p) - \text{mean}[R]| < \varsigma \ \&\& \ \exists (x_{adj}, y_{adj}) \in R, \\ & |f(x_p, y_p) - f(x_{adj}, y_{adj})| < \Delta \\ \notin R & \text{else} \end{cases},$$

in the above formula (a), $(x_p, y_p)$ refers respectively to the horizontal and vertical coordinates defined on the original image, R refers to the pixel set of current grayscale BGA solder ball, mean[R] refers to the mean grayscale value of all pixels in the current grayscale BGA solder ball, $(x_{adj}, y_{adj})$ refers to the coordinates which is adjacent in 8-conectivity to $(x_p, y_p)$ which is already belonged to the pixels of R, $\varsigma$ and $\Delta$ refers to the preset constant; $f(x_p, y_p)$ refers to the grayscale value at the point $(x_p, y_p)$ in the original image;

in the center position coordinates of each complete grayscale BGA solder ball: the formula (b) to calculate the center position coordinates $(x_{center}^i, y_{center}^i)$ of the i-th complete grayscale BGA solder ball is:

$$(x_{center}^i, y_{center}^i) = \left( \frac{\sum_{k=1}^{N_i} x_k}{N_i}, \frac{\sum_{k=1}^{N_i} y_k}{N_i} \right),$$

where $(x_k, y_k)$ refers to the k-th number of grayscale pixel coordinates contained in the i-th complete grayscale BGA solder ball, $N_i$ refers to the number of grayscale pixel contained in the i-th complete grayscale BGA solder ball, i is a positive integer, k is a positive integer;

in the roundness of each complete grayscale BGA solder ball: the area $S_i$ of the i-th complete grayscale BGA solder ball is the number of pixels $N_i$ contained in this complete grayscale BGA solder ball; the formula (c) is used to calculate the roundness $C_i$ for the i-th complete grayscale BGA solder ball and the formula (c) is:

$$C_i = \frac{4\pi N_i}{L_i^2},$$

where, $L_i$ is the perimeter of the i-th complete grayscale BGA solder ball, which is the peripheral pixel number of the complete grayscale BGA solder ball.

3. The multi-type BGA chip visual recognition method using line-based-clustering according to claim 2, characterized in that: in the step 4, the process for local analysis of regular type BGA chip comprises the steps of:

Step 4-1: in the BGA solder ball label image, selecting any equivalent BGA solder ball;

Step 4-2: defining the equivalent BGA solder ball selected in the step 4-1 as a center, within the radius range of $3\Delta\gamma$, searching within the scope of four directions of [−45°,45°), [45°,135°), [135°,225°) and [−135°,−45°) respectively to locate the closest equivalent BGA solder ball to the equivalent BGA solder ball selected in the step 4-1, wherein if the closest equivalent BGA solder ball in the four directions does not exist, repeat the step 4-1;

Step 4-3: for the closest adjacent equivalent BGA solder ball at each direction, obtaining the coarse orientation angle $\Delta\theta$ of equivalent BGA array corresponding to the j direction is by a formula (d):

$$\Delta\theta_j = \pm \arctan\left( \frac{y_{adj}^j - y_{center}}{x_{adj}^j - x_{center}} \right) \pm 90°,$$

in the formula (d), $(x_{center}, y_{center})$ refers to the coordinates of the center of the equivalent BGA solder ball, $(x_{adj}^j, y_{adj}^j)$ refers to the closest equivalent BGA solder ball corresponding to the j direction; meanwhile, ±90° and positive and negative sign is selected or removed based on the conditions of the four directions; j=1 refers to the range of [−45°,45°); j=2 refers to the range of [45°,135°); j=3 refers to the range of [135°,225°); j=4 refers to the range of [−135°,−45°); and taking an average of all $\Delta\theta_j$ to determine the final coarse orientation angle $\Delta\theta$ of the equivalent BGA array; wherein in the image coordinates system, define $\Delta\theta$ in clockwise direction as positive.

4. The multi-type BGA chip visual recognition method using line-based-clustering according to claim 3, characterized in that: in the step 4, a process of local analysis of irregular type BGA chip comprises the steps of:

Step 4-1: in the BGA solder ball label image, selecting any equivalent BGA solder ball;

Step 4-2: defining the equivalent BGA solder ball selected in the step 4-1 as the center, within the radius range of $3\Delta\gamma$, searching within the scope of four directions of [0°,90°), [90°,180°), [180°,270°) and [−90°,0°) respectively to locate the closest equivalent BGA solder ball to the equivalent BGA solder ball at the center, wherein if the closest equivalent BGA solder ball in the four directions does not exist, repeat the step 4-1;

Step 4-3: for each closest adjacent equivalent BGA solder ball at each direction, obtaining the coarse orientation angle Δθ of equivalent BGA array corresponding to the j direction is obtained by the formula (e):

$$\Delta\theta_j = \pm\arctan\left(\frac{y_{adj}^j - y_{center}}{x_{adj}^j - x_{center}}\right) \pm 90°,$$

where ($x_{center}$, $y_{center}$) refers to the coordinates of the center of the equivalent BGA solder ball, ($x_{adj}^j$, $y_{adj}^j$) refers to the closest equivalent BGA solder ball corresponding to the j direction; meanwhile, the ±90° in the above formula and positive and negative sign is selected or removed based on the conditions of the four directions; j=1 refers to the range of [0°,90°); j=2 refers to the range of [90°,180°); j=3 refers to the range of [180°,270°); j=4 refers to the range of [−90°,0°); and taking an average of all Δθ$_j$ to determine the final coarse orientation angle Δθ of the equivalent BGA array; wherein in the image coordinates system, defining Δθ in clockwise direction as positive.

5. The multi-type BGA chip visual recognition method using line based clustering according to claim 4, characterized in that: in the step 5, a process of utilizing the representative spacing value Δγ of the equivalent BGA solder balls obtained from step 3 and the coarse orientation angle Δθ of the equivalent BGA array obtained from step 4, performing line based clustering for all the equivalent BGA solder balls in the BGA solder ball label image to obtain row equivalent BGA solder ball clusters, column equivalent BGA solder ball clusters and boundary equivalent BGA solder ball clusters comprises the steps of:

Step 5-1: based on the coarse orientation angle Δθ of the equivalent BGA array, determining the row line equation expression of equivalent BGA solder balls as: $y_{center}=\tan(\Delta\theta)x_{center}+b_{row}$ and the column line equation expression of equivalent BGA solder balls as: $y_{center}=\tan(\Delta\theta+90°)(x_{center}-b_{col})$;

Wherein, ($x_{center}$, $y_{center}$) refers to the center position coordinates of the complete grayscale BGA solder ball that the row or column lines pass through, $b_{row}$ refers to the intercept of row line with y axis of the image coordinate system, $b_{col}$ refers to the intercept of column line with the x axis of the image coordinate system;

Step 5-2: determining the classification threshold for the row line and the column line based clustering:

$$\text{intercept\_thresh} = \frac{0.3 \cdot \Delta\gamma}{\sin\Delta\theta};$$

Step 5-3: processing row line based clustering for all equivalent BGA solder balls by utilizing the coordinates ($x_{center}^i$, $y_{center}^i$) of the i-th equivalent BGA solder ball to inversely calculate the intercept of row line equation passing through the solder ball, where:

$b_{row}^i = y_{center}^i - \tan(\Delta\theta)x_{center}^i$;

Step 5-4: base on the classification threshold intercept_thresh, perform clustering for all obtained row intercepts, that is with the distance between current intercept $b_{row}^i$ and one cluster center within the classification threshold intercept_thresh, the current row intercept $b_{row}^i$ is clustered into this class, the equivalent BGA solder balls corresponding to row intercepts of one class is accordingly clustered together to form a row equivalent BGA solder ball cluster and the equivalent BGA solder balls in one row cluster are located at the same row;

Step 5-5: after the process of clustering in step 5-4, identifying the row equivalent BGA solder ball cluster having only one intra-cluster element as non-ball interference and exclude this cluster; the number of row equivalent BGA solder ball clusters is the row number of solder balls in the BGA chip;

then sorting all the row equivalent BGA solder ball clusters based on the ascending order of the averages of their corresponding intra-class row intercepts, the row equivalent BGA solder ball clusters obtained after sorting process are arranged in ascending order based on the row number of the equivalent BGA array;

Step 5-6: processing column line based clustering for all equivalent BGA solder balls: utilize the coordinates ($x_{center}^i$, $y_{center}^i$) of the i-th equivalent BGA solder ball to inversely calculate the column intercept $b_{col}^i$ of line equation passing through the solder ball, where:

$$b_{col}^i = x_{center}^i - \frac{y_{center}^i}{\tan(\Delta\theta + 90°)};$$

Step 5-7: base on the classification threshold: intercept_thresh, performing clustering for all obtained column intercepts, that is with the distance between the current column intercept $b_{col}^i$ and one cluster center within the threshold value intercept_thresh, the current column intercept $b_{col}^i$ is clustered into this class, the equivalent BGA solder balls corresponding to the column intercepts of one class is accordingly clustered together to form a column equivalent BGA solder ball column cluster and the equivalent BGA solder balls in one column cluster are located at the same column;

Step 5-8: after the process of clustering in step 5-7, identifying the column equivalent BGA solder ball cluster having only one intra-cluster element as non-ball interference and exclude this cluster; the number of column equivalent BGA solder ball clusters is the column number of solder balls then sorting all the column equivalent BGA solder ball clusters based on the ascending order of averages of their corresponding intra-class column intercepts, the column equivalent BGA solder ball clusters obtained after sorting process are arranged in ascending order based on the column number of the equivalent BGA array;

Step 5-9: extracting the first group and last group of the sorted row equivalent BGA solder ball clusters; extracting the first group and last group of the sorted column equivalent BGA solder ball clusters; and defining the extracted four groups as the boundary equivalent BGA solder ball clusters.

6. The multi-type BGA chip visual recognition method using line based clustering according to claim 5, characterized in that: in the step 7, the process of utilizing the information list for all complete grayscale BGA solder balls obtained from the step 2 to perform line fitting for each row equivalent BGA solder ball cluster comprises the steps of:

utilizing the grayscale value of each equivalent BGA solder ball in current row equivalent BGA solder ball cluster in the BGA solder ball label image, searching the center position coordinates of the corresponding complete grayscale BGA solder ball in the information list for all complete grayscale BGA solder balls, and performing line fitting for the center position coordinates of the complete grayscale BGA solder ball in each row.

7. The multi-type BGA chip visual recognition method using line based clustering according to claim 6, characterized in that: in the step 7, the process of utilizing the information list for complete grayscale BGA solder ball obtained from the step 2 to perform line fitting for each column equivalent BGA solder ball cluster comprises the steps of:

Utilizing the grayscale value of each equivalent BGA solder ball in current column equivalent BGA solder ball cluster in the BGA solder ball label image, searching the center position coordinates of the corresponding complete grayscale BGA solder ball in the information list for all complete grayscale BGA solder balls, and performing line fitting for the center position coordinates of the complete grayscale BGA solder ball in each column.

8. The multi-type BGA chip visual recognition method using line based clustering according to claim 7, characterized in that: in the step 8, the process of utilizing the fitting lines for each row equivalent BGA solder ball cluster and each column equivalent BGA solder ball cluster, performing row by row and column by column searching for equivalent BGA solder balls on the BGA solder ball label image to obtain BGA solder ball distribution matrix; based on the equivalent BGA solder balls obtained by row by row and column by column searching and the information list for all complete grayscale BGA solder balls obtained from step 2, obtaining the standard diameter of BGA solder ball, the standard perimeter of BGA solder ball and the standard roundness of BGA solder ball comprises the steps of:

Solving the intersection positions of each row line fitting equation for the row equivalent BGA solder ball cluster and each column line fitting equation for the column equivalent BGA solder ball cluster, using the intersections positions as the centers to perform local searching on the BGA solder ball label image within the radius of $\Delta\gamma/2$; if a particular equivalent BGA solder ball is located, the value at the corresponding row and column position in the BGA arrangement matrix is set to 1, otherwise, the value at the corresponding row and column position in the BGA arrangement array is set to 0;

the process of obtaining the standard diameter of BGA solder ball, the standard perimeter of BGA solder ball and the standard roundness of BGA solder ball which is based on the equivalent BGA solder balls obtained by row by row and column by column searching and the information list for all complete grayscale BGA solder balls obtained from the step 2, comprises the steps of:

defining the average value of the diameters of minimum outer surrounding circle in the information list corresponding to all the equivalent BGA solder balls obtained by searching as the standard diameter of the BGA solder ball; defining the average value of the perimeters in the information list corresponding to all the equivalent BGA solder ball obtained by searching as the standard perimeter of the BGA solder ball; defining the average value of the roundness in the information list corresponding to all the equivalent BGA solder ball obtained by searching as the standard roundness of the BGA solder ball.

\* \* \* \* \*